United States Patent [19]

Graff

[11] 3,852,938

[45] Dec. 10, 1974

[54] ARTICLE PACKING APPARATUS AND METHOD

[75] Inventor: William R. Graff, Lynchburg, Va.

[73] Assignee: Alliance Industrial Corporation, Lynchburg, Va.

[22] Filed: May 18, 1973

[21] Appl. No.: 361,768

[52] U.S. Cl............................ 53/35, 53/61, 53/143, 53/161, 214/1 BV
[51] Int. Cl.......................... B65b 5/08, B65b 35/56
[58] Field of Search ... 53/35, 143, 161, 166, 61–62; 214/1 BV; 198/33 AD

[56] References Cited
UNITED STATES PATENTS

| 3,160,259 | 12/1964 | Dalton | 53/61 X |
|---|---|---|---|
| 3,694,993 | 10/1972 | East | 53/35 X |

Primary Examiner—Travis S. McGehea
Attorney, Agent, or Firm—Griffin, Branigan and Butler

[57] ABSTRACT

An apparatus and method are described for packing a plurality of containers in a case at a packing station. The apparatus comprises a plurality of suction cups mounted on vacuum manifolds suspended between two flexible endless transporting chains which are laterally spaced from one another. Containers are deposited on the vacuum cups and a vacuum is applied to the manifolds. The transporting chains are then driven to invert the suction cups and gripped containers. The vacuum is then disabled and the containers are left in cartons located below the transporting chains.

Once a vacuum is applied to the manifolds, the transporting chains are driven in response to a drop in pressure in the manifolds so that as soon as all containers are gripped by the suction cups, the pressure drops and the chains are driven.

A product retainer which controls the flow of containers to the packing station comprises solenoid-actuated clamping surfaces on both sides of a dead plate and flexible portions of lane dividers separating lanes of conveyed articles. To stop the flow of containers in all lanes, the clamping surfaces press inwardly on containers in outside lanes, and this inward pressure is transmitted across all the lanes via the flexible lane-divider portions.

9 Claims, 5 Drawing Figures

ARTICLE PACKING APPARATUS AND METHOD

BACKGROUND OF THE INVENTION

This invention relates broadly to the art of container packing apparatus, and more specifically to such apparatus which receive containers at packing stations and invert these containers, leaving them upside down in cartons located at the bottoms of the stations.

Some such packing apparatus are described in U.S. Pat. Nos.: Nos. 3,694,993 to East; 3,702,527 to Johnson; 3,589,094 to Pearson; and 3,486,292 to Ninneman.

Some of these devices, such as East's, comprise rotatable supports, or surfaces, located at packing stations, onto which containers, such as bottles, are conveyed along a plurality of lanes. In East's device, for example, once the bottles are on the surface, bottle-supporting bars are moved laterally so that the bottles fall on continuously acting vacuum cups. At this point, the surface rotates 180° about an axis parallel to the flow of bottles to the surface. The bottles are then released from the cups and drop into a case located below the surface. Gates located between a conveyor and the surface move into and out of the lanes to control flow of bottles from the conveyor onto the surface.

A device such as East's has the disadvantage that it must rotate about an axis parallel to the direction of conveyed container flow; thus, flow direction is changed. Further, it is somewhat cumbersome and complicated to move gates into and out of lanes.

Such a container packing device should have the following qualities:

It should be fast in operation;
It should not be unduly complicated in structure;
It should be reliable; and
It should be smooth in operation so as not to damage containers.

It is an object of this invention to provide such a container packing apparatus.

SUMMARY OF THE INVENTION

According to the principles of this invention a loading mechanism at a packing station comprises suction cups mounted on endless transporting chains. Containers to be packed are deposited on the suction cups and a vacuum is applied to the suction cups so that they grip the deposited containers. The transporting chains are then driven to invert the deposited containers and a carton is raised to enclose the containers. The vacuum is then disabled so that the inverted containers are left in the carton upside down.

Another feature of this invention is a product retainer for controlling flow to the packing station which comprises solenoid-actuated clamping surfaces located on both sides of a dead plate and flexible portions of lane dividers separating lanes of conveyed articles. To terminate container flow in all lanes, the clamping surfaces are pressed inwardly, on containers in outside lanes, and this inward pressure is transmitted across all lanes through the flexible portions of lane dividers.

Still a further feature of the invention is that the conveyor chains are driven in response to a drop in pressure in the suction cups, thus, they are driven as soon as all containers have been gripped by the suction cups.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphases instead being placed upon illustrating the principles of the invention in a clear manner.

DESCRIPTION OF THE PREFERRED EMBODIMENT

Figure 1:
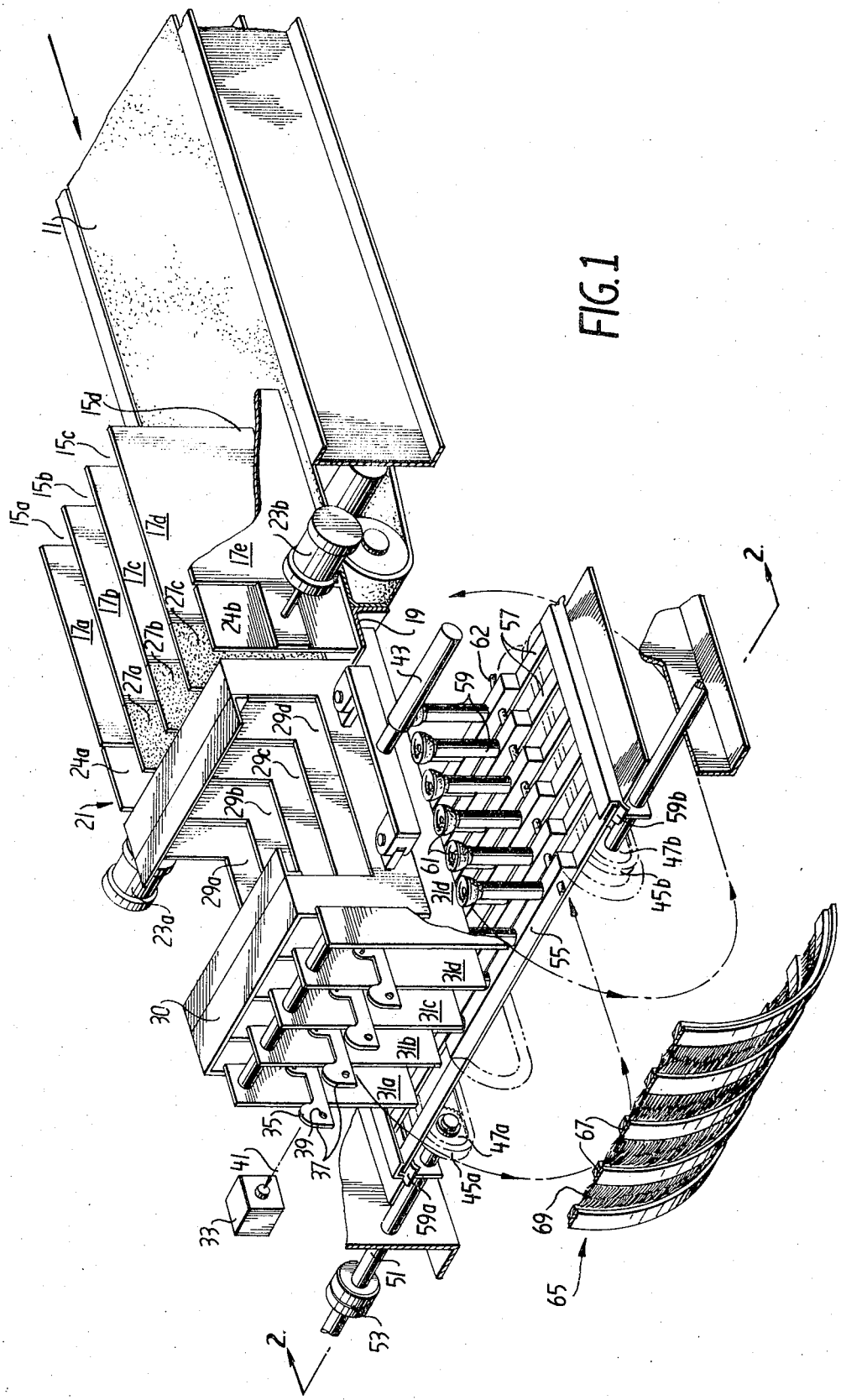
FIG. 1 is an isometric view of apparatus according to principles of this invention at a packing station.

Referring now to the drawings, and more particularly to FIG. 1, a continuously operated infeed conveyor 11 continuously feeds containers, such as bottles 13 (FIGS. 2–4), to lanes 15a–d which are defined by lane dividers 17a–e. Lanes 15 extend to a stationary dead plate 19, across which bottles are urged by line pressure created by the infeed conveyor 11.

A product retainer 21 controls flow of bottles across the stationary dead plate 19. The product retainer 21 comprises two solenoids 23a and b, resilient clamping surfaces 24a and b, and flexible lane divider portions 17a–c. To prevent flow of bottles across the stationary dead plate 19 the solenoids 23 are actuated to urge bottles in outside lanes 15a and 15d inwardly, and this inward pressure is transmitted across all the lanes via the flexible land dividers 27a–c.

Containers 13 which are allowed to move across the stationary dead plate 19 enter lanes 29a–d which are defined by a single integral lane defining grid means 30. When bottles first enter the lanes 29a–d they are supported by rigidly mounted loading-area ride bars 31a–d which extend under and, initially, are located approximately in the centers of the lanes 29a–d.

When there are no containers in the lanes 29a–d, light from a light source 32 (FIG. 2) is prevented from reaching a light sensor 33 (FIGS. 1 and 2) by enlarged portions 35 of container sensor levers 37. However, as the lanes 29a–d fill up, line pressure rotates the container sensor levers 36, which are pivotally mounted on the ride bars 31 (FIG. 3). When all of the lanes 29a–d are filled, apertures 39 in the levers 37 line up to allow a light beam 41 to reach the light sensor 33.

An actuating rod 43 is attached to the lane defining grid 30 to move the lane defining grid 30 laterally (moving mechanism not shown) in response to a signal from the light sensor 33.

First and second transporting chains 45a and b (FIGS. 1–3) are mounted below the lanes 29a–d on driving sprockets 47a and b and idler sprockets 49 (FIG. 3). The driving sprockets 47a and b are mounted on a drive shaft 51 which is driven through a combination friction clutch and brake 53. It should be noted that the transporting chains 45 are driven in the same direction as is the infeed conveyor 11.

Vacuum manifold bars 55 (FIGS. 1-3) are mounted on the transporting chains 45a and b and extend therebetween. In addition, vacuum manifold stabilizers 57 are each respectively mounted on a vacuum manifold bar 55 and ends thereof ride in stabilizing tracks 59a and b for maintaining the vacuum manifold bars 55 in proper attitudes while they are in the on-top position as depicted in FIG. 1.

Figure 5:
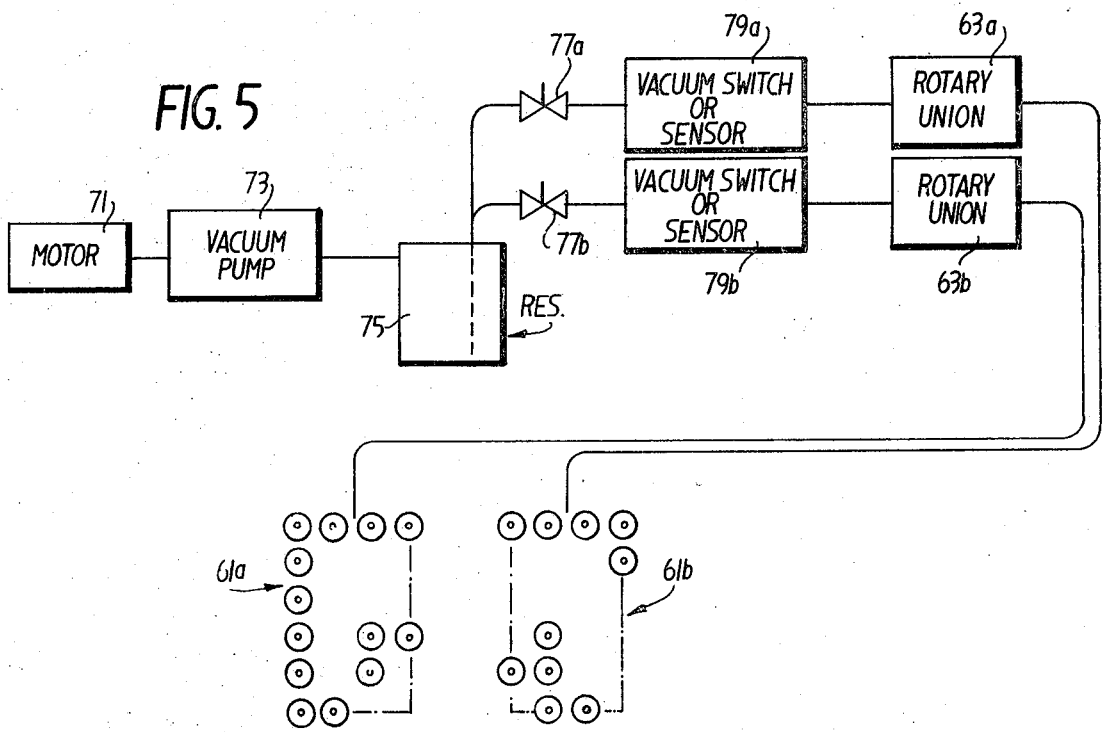

Extending from each of the vacuum manifold bars 55 are vacuum pipe stems 59, and mounted at the ends of the vacuum pipe stems are suction cups 61. In addition, the vacuum manifold bars 55 are interconnected by linking tubes 62; thus, when a vacuum is applied to one of the vacuum manifold bars 55, it is applied to all vacuum manifold bars 55 which are linked to that vacuum manifold bar by the linking tubes 61. In this regard, there are two groups of interconnected vacuum bars. As is depicted in FIG. 3, when the transporting chains 45 are at rest, one group of vacuum manifold bars 55a is positioned above the chains and the other group of vacuum manifold bars 55b are positioned below the chains. Thus, when a vacuum is applied to one vacuum manifold bar in one of the groups, for example in group 55a, it is immediately applied to all of the suction cups mounted on the vacuum bars in that group. In this regard, a single rotary union 63 is depicted in FIG. 3 for providing a vacuum to one group of vacuum manifold bars 55a. Another rotary union for supplying a vacuum for the vacuum bars 55b is not depicted in FIG. 3 for the sake of clarity, but is in FIG. 5.

Figure 3:
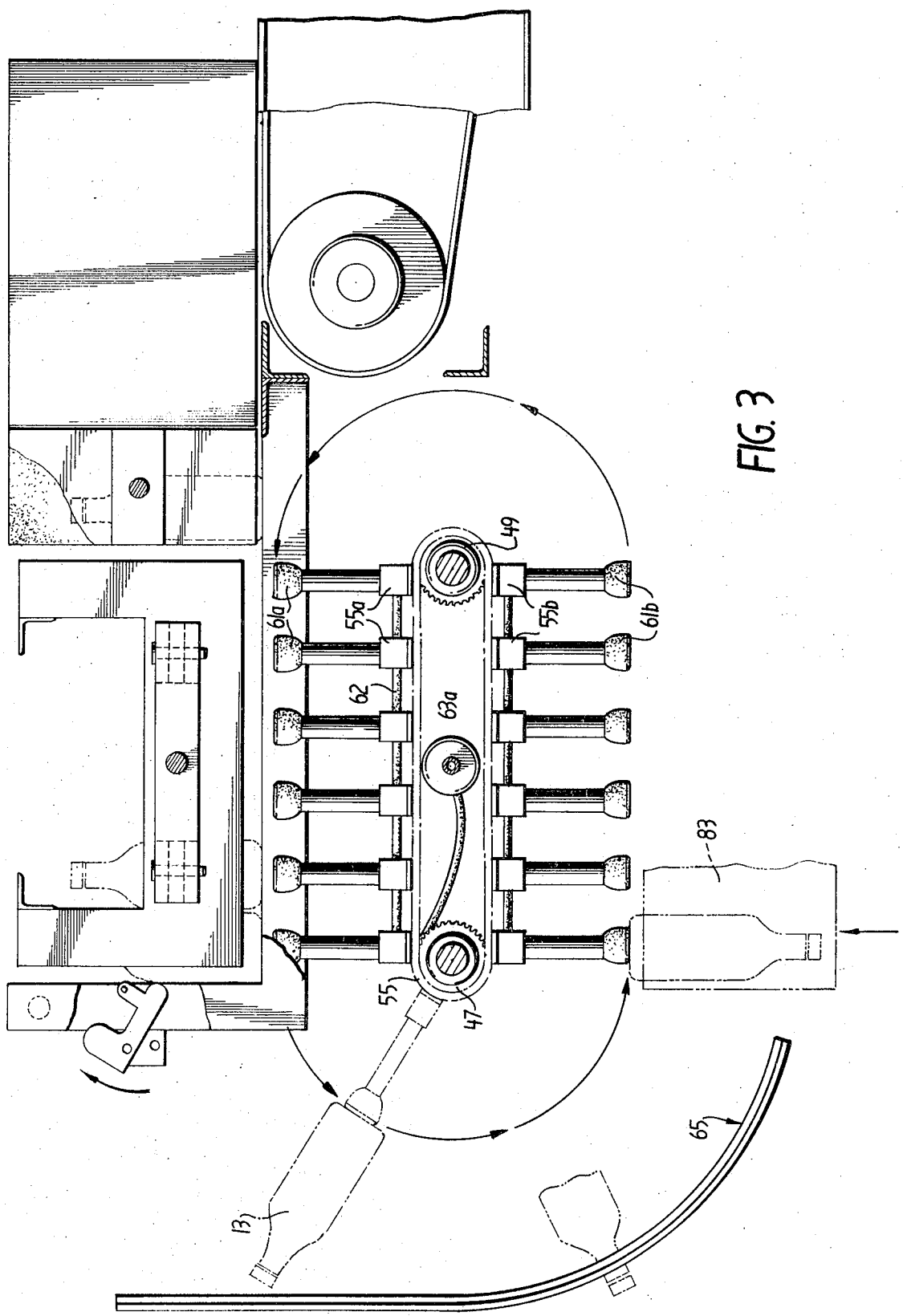
FIG. 3 is a sectional view taken on line 3—3 in FIG. 2.
Figure 4:
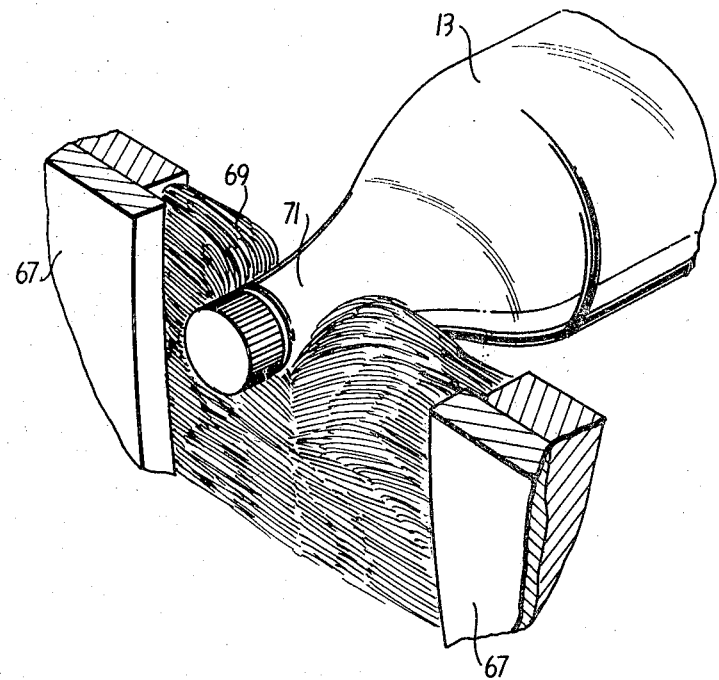
FIG. 4 is an enlarged isometric view of the neck of a bottle being retarded in movement by a swing dampener employing principles of this invention; and, FIG. 5 is a schematic representation of a vacuum system employed with the embodiment of this invention depicted in the other drawings.

A swing dampener 65 (FIGS. 1, 3 and 4) comprises parallel frames 67 (FIGS. 1 and 4) having laterally projecting bristles 69 mounted thereon. In the preferred embodiment, the bristles 69 are constructed of nylon, however, other materials could be used such as Teflon coated steel. As depicted in FIG. 4, the bristles 69 allow necks 71 of bottles 13 to pass between parallel frames 67 but yet dampen such movement so as to prevent unduly fast swinging of the bottles 13 as they are inverted from an upturned position to a downturned position.

With reference to FIG. 6 wherein a vaccum circuit for this device is depicted, a motor 71 drives a vacuum pump 73. The vacuum pump 73 tends to evacuate a reservoir 75 so as to maintain a constant partial vacuum in the reservoir 75. Electronically actuated valves 77a and b alternately connect the vacuum reservoir 75 with the rotary unions 63a and b via vacuum or pressure sensors 79a and b. As was described above, the rotary unions 63a and b respectively communicate with groups of suction cups 61a and b.

Figure 2:
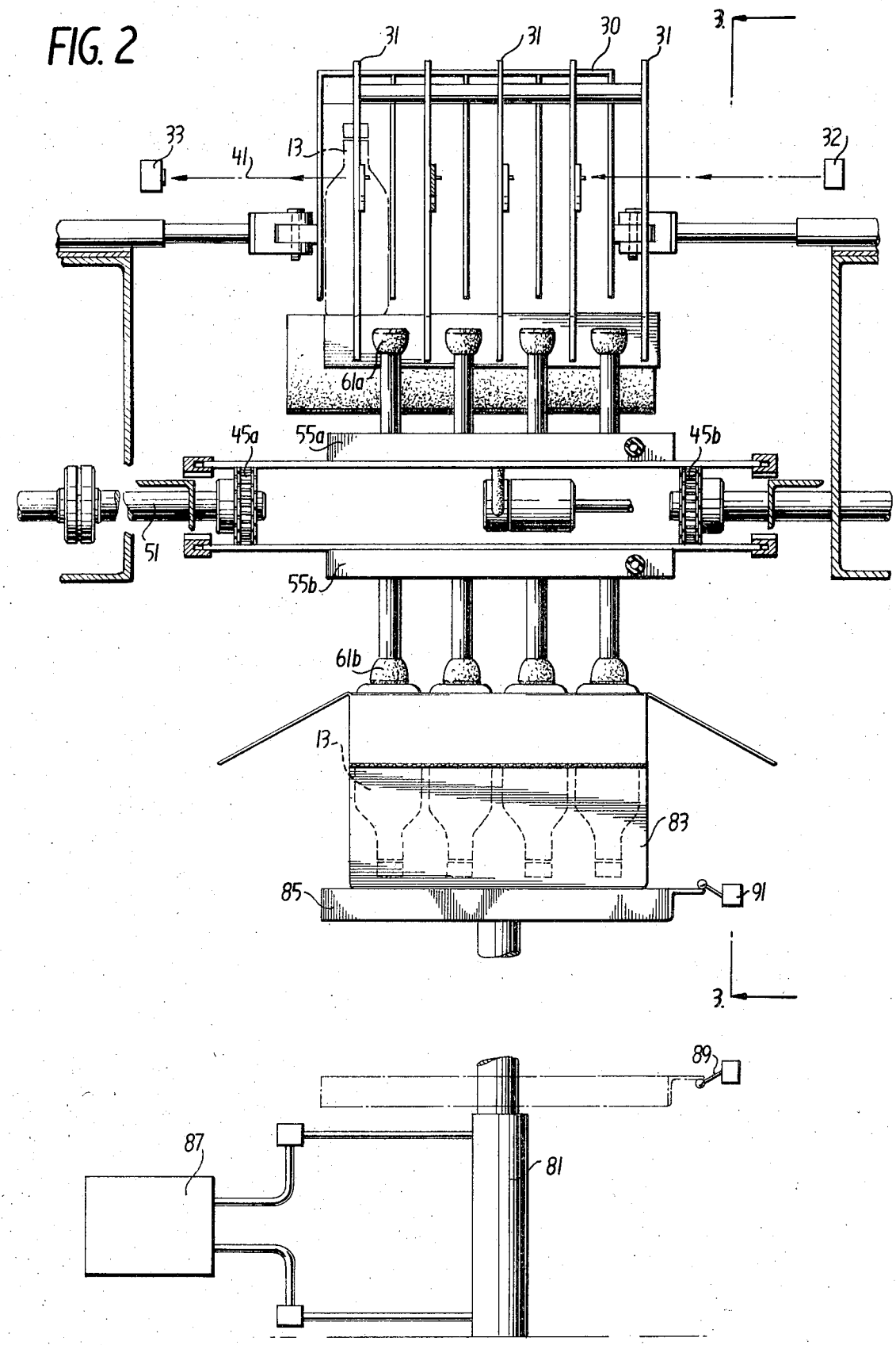
FIG. 2 is a sectional view taken on line 1–2 in FIG. 1 and includes additional elements which are inconvenient to depict in FIG. 1.

With reference to FIG. 2, a hydraulic cylinder 81 raises a carton 83 on a platform 85 to enclose bottles 13 which are inverted below the conveyor chains 45a and b. When the suction cups 61b are deenergized a two-way valve 87 controls the hydraulic cylinder 81 to lower the carton 13 and it is conveyed away. A new carton is thereafter conveyed onto the platform 85.

In operation (FIG. 1) bottles 13 to be packed are conveyed by the infeed conveyor 11 into the lanes 15a–d. The solenoid 23a and b being deactivated, the bottles cross over the stationary dead plate 19 and enter the lanes 29a–d at the packing station. When the lanes 29a–d are full all of the container sensor levers 37 are pivoted so that their apertures 39 line up to allow the light beam 71 to reach the light sensor 33. The bottles in the lanes 29a–d are now resting on the ride bars 31a–d.

When actuated, the light sensor 33 sends a signal to the solenoids 23a and b causing them to pass the pressure plates 24a and b against containers respectively located on the stationary dead plate 19 in lanes 17a and d. This pressure is also transmitted to containers on the dead plate 19 located in the lanes 17d and c via the flexible lane-divider portions 27a–c. Thus, containers on the dead plate 19 are clamped against further forward movement.

Simultaneously therewith, the light sensor 33 also sends a signal to a motivating mechanism (not shown) to move the actuating rod 43, and the attached lane defining grid 30, laterally. Lateral movement of lane defining grid 30 (FIG. 2) pushes the containers 13 off of the ride bars 32 and allows them to drop on suction cups 61a.

The light sensor also sends a signal to valve 77a (FIG. 5) to open valve 77a. Valve 77b is presently closed in response to a switch 89 on the platform 85 (FIG. 2) as will be further described below. In this regard, when the bottles 13 drop on the suction cups 61a they are thereby gripped by a vaccum which is applied to the suction cups 61a. The vacuum switch or sensors 79a and b (FIGS. 5) monitor pressures in vacuum cups 61a and b and thereby senses when all of the vacuum cups 61a have gripped bottles and when all of vacuum cups 61b have released bottles. The sensors 79a and b, at that time, combine to provide a signal which actuates the clutch/brake 53 to drive the transport chains 45a and b, but only if switch 80 indicates that the platform 85 is in the down position. As seen in FIG. 3, the bottles 13 which are gripped by the suction cups 61a are transported around the driving sprockets 47 until they are upside down below the transporting chains 45a and b. While being transported around the sprockets, the containers are prevented from swinging unduly by the swing dampener 65.

Once all of the suction cups 61a have moved from the upper position to the lower position, and all of the suction cups 61b have moved from the lower position to the upper position, this is sensed by a device which measures the extent of travel of the transporting chains 45 (this device is not shown). At this time the friction clutch/brake 53 is actuated to prevent further motion of the transporting chains.

The two-way valve 87 is then actuated to raise the platform 85 so that the carton 83 encloses the bottles 13 which are hanging downwardly (FIG. 3). The switch 89 (FIG. 2) strikes an abutment 91 when the platform 85 is in its up position and deactivates the solenoids 23a and b (FIG. 1) to thereby relieve pressure on the pressure plates 24a and b and allow bottles to once again flow into the lanes 29a –d. At the same time, the switch 89 sends a signal to the valve 77a (FIG. 5) to close this valve and thereby deenergize the vacuum cups 61a and allow the bottles 13 in the carton 83 to remain there. The platform 85, with its carton, is then lowered and the carton is transported further. A new carton is also transported onto the platform 85. At this time the cycle is repeated.

It should be understood by those skilled in the art that the bottle packing device described herein is relatively uncomplicated in structure and operation. Further, this apparatus is fast and reliable. In this regard, tests indicate that this apparatus is 50 percent faster than most other similar bottle packing apparatus.

While the invention has been particularly shown and described with reference to a preferred embodiment, it will be understood by those skilled in the art that various changes in form and detail may be made therein without departing from the spirit and scope of the invention. For example, the container sensor levers 36 could be designed to operate in various manners, such as they could be designed to cooperative with aligned holes in the ride bars 31a–d. Further, the swing dampener 65 could be designed with bristles, extending inwardly on an angle to brush the tops of flat-topped containers.

The embodiments of the invention in which an exclusive property or privilege is claimed are defined as follows:

1. An apparatus for automatically packing a plurality of containers in a case at a packing station, said apparatus comprising:
 a conveyor means for conveying a continuous supply of containers in an upturned position in a given direction to said packing station;
 a loading mechanism for inverting said containers conveyed to said station to an upside down position and leaving said upside down containers in cartons positioned below said loading mechanism said loading mechanism including:
 a flexible endless transporting means extending between two wheels;
 a plurality of suction cups mounted on said flexible endless transporting means;
 depositing means at said packing station for depositing said upturned containers on said suction cups;

vacuum applying means for applying a vacuum to said suction cups and thereby causing said suction cups to grip the bottoms of said upturned containers; and,
 drive means coupled to one of said wheels for driving said flexible endless transporting means to invert said suction cups and gripped containers to downturned positions;
and,
 releasing means for releasing said containers after said suction cups and said gripped containers are inverted.

2. An apparatus for automatically packing containers as in claim 1 wherein said flexible endless transporting means comprises two flexible endless members, laterally spaced from one another, each being mounted on, and meshing with two gears;
 and wherein said suction cups are mounted on a plurality of manifold means which extend between said two flexible endless transporting members for distributing pressure applied to said manifold means to said suction cups.

3. An apparatus for automatically packing a plurality of containers as claimed in claim 2 wherein is further included a dampener device for dampening the swinging movement of said containers as they are transported around said gears by said flexible endless transporting members.

4. An apparatus for automatically packing a plurality of containers as claimed in claim 2 wherein is further included a means for controlling flow of containers to said packing station along a plurality of adjacent parallel lanes, said control means comprising:
 pressure plates positioned adjacent the outside lanes;

actuating means for causing at least one of said pressure plates to press inwardly against a container in one of said outside lanes toward the other pressure plate; and
 flexible lane dividers aligned between said pressure plates for transmitting forces created by said pressure plates between containers in said plurality of lanes;
 whereby, when said at least one pressure plate is urged inwardly, said containers in said plurality of lanes are clamped between said pressure plates and container flow is cut off.

5. A method of packing containers comprising the steps of:
 depositing upturned containers on gripping members mounted on a flexible endless transporting means which is, in turn, mounted on at least two wheels;
 activating said gripping members so that said gripping members grip said containers;
 driving said flexible endless transporting means so that said gripping members gripping said containers travel around one of said wheels and thereby invert said gripped containers to downturned positions;
 moving a carton so as to receive said downturned containers; and,
 deactivating said gripping members thereby leaving said containers in said cartons in said downturned positions.

6. An apparatus for automatically packing a plurality of containers in a case at a packing station, said apparatus comprising:
 a conveyor means for conveying a continuous supply of containers in an upturned position in a given direction to said packing station;
 a loading mechanism for inverting said containers conveyed to said station to upside down positions and leaving said upside down containers in cartons positioned below said loading mechanism said loading mechanism including:
 a flexible endless transporting means extending between at least two wheels;
 a plurality of rigid supporting surface members, each defining a separate supporting surface for receiving a row of said containers, mounted on said flexible endless transporting means, there being freedom of movement between said supporting surface members;
 a gripping means mounted on each of said supporting surfaces members for gripping said containers;
 a first actuating means for actuating said griping means to grip said container and hold said containers to said respective supporting surface members;

a drive means coupled to at least one of said wheels for driving said flexible endless transporting means to invert said supporting surface members and said gripped containers to downturned positions; and,
 a second actuating means for actuating said gripping means to release said containers after said supporting surface members and said gripped containers are inverted.

7. An apparatus for automatically packing containers as in claim 6 wherein said flexible endless transporting means comprises two flexible endless members, laterally spaced from one another, each being mounted on, and meshing with two gears;

and wherein said surface support members extend between said two flexible endless transporting members.

8. An apparatus for automatically packing a plurality of containers as claimed in claim 7 wherein is further included a dampener device for dampening the swinging movement of said containers as they are transported around said gears by said flexible endless transporting members.

9. An apparatus for automatically packing a plurality of containers as claimed in claim 6 wherein said depositing means comprises:

a plurality of stationary parallel ride bars, each for supporting a column of containers received from said conveyor means above said flexible endless transporting means;

a plurality of parallel lane defining grids positioned beside said columns of containers for laterally maintaining said containers supported by said stationary ride bars; and a grid actuating means for moving said parallel lane defining grids laterally to thereby move said columns of containers laterally off of said stationary ride bars whereby said containers fall on said plurality of supporting surface members.

* * * * *